Jan. 9, 1940.  A. L. HALVORSEN  2,186,584
AUTOMOBILE SLEEPING COMPARTMENT
Filed June 17, 1936  2 Sheets-Sheet 1
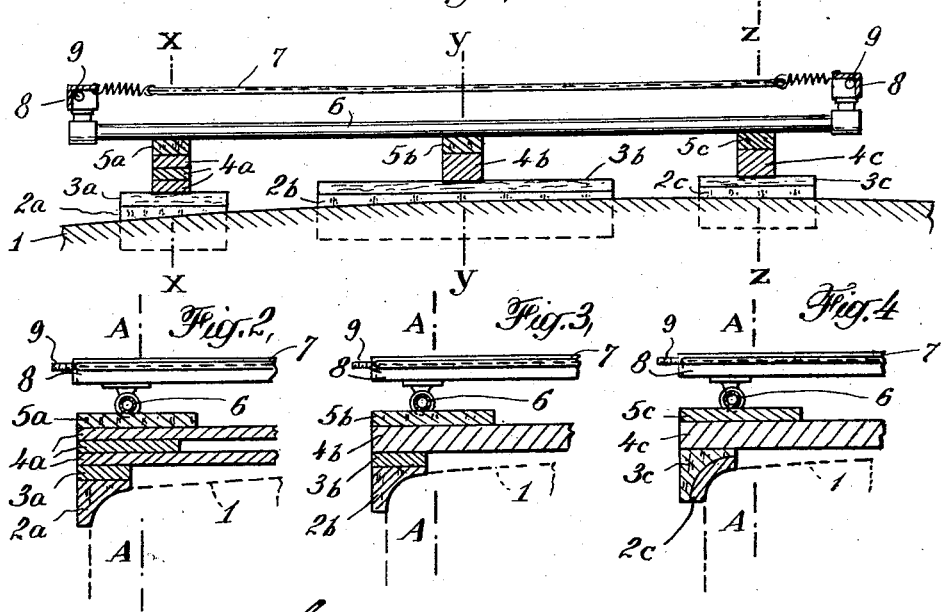
INVENTOR
Arthur Ludwick Halvorsen
BY
Pennie Davis Marvin & Edmonds
ATTORNEYS Jan. 9, 1940.　　A. L. HALVORSEN　　2,186,584
AUTOMOBILE SLEEPING COMPARTMENT
Filed June 17, 1936　　2 Sheets-Sheet 2

INVENTOR
Arthur Ludwick Halvorsen
BY
Pennie Davis Marvin & Edmonds
ATTORNEYS

Patented Jan. 9, 1940

2,186,584

UNITED STATES PATENT OFFICE 2,186,584

AUTOMOBILE SLEEPING COMPARTMENT

Arthur Ludwick Halvorsen, Staten Island, N. Y.

Application June 17, 1936, Serial No. 85,654

3 Claims. (Cl. 5—119)

This invention relates to a sleeping compartment adapted to be mounted atop a passenger automobile of the enclosed or sedan type and it has for its object the provision of an improved assembly comprising a demountable bedspring, mattress and collapsible, waterproof, tent-like covering therefor.

In recent years, the practice of making extended tours of the country in an automobile and of camping out at night has become quite common. In an attempt to supply the demand which naturally arose for suitable ambulatory sleeping quarters, attachments and accessories of various types, such as auto penthouses, trailers, tents and the like, adapted to be used upon or in conjunction with an automobile, have been put on the market. However, for one reason or another, these accessories and attachments have not proven to be very satisfactory, either by reason of cost or ease and practicability in use.

Rough and hilly ground, bad roads, and even good roads in cold and slippery weather, make the use of a trailer undesirable. Again, a trailer adds considerably to the load placed upon the motor.

Some of the troubles encountered in using commercial automobile ground tents are the difficulty in erecting them, especially after dark, and the danger of insects, reptiles and animals entering them.

Heretofore, many attempts have been made to utilize the permanent tops of automobiles for sleeping purposes but the devices employed to accomplish this end have been unsuitable, either because of the discomfort experienced by users in trying to sleep upon an uneven and non-resilient surface, or because the comparatively weak central top area of the automobiles were unable to sustain the unusual and unequally distributed combined weights of the devices and their occupants, which they were not intentionally designed to support, with consequent injury to the roofs and resulting sometimes in a degree of bending of the side walls and rear corners of the automobile body, at or near the rear fenders.

The present invention seeks to overcome the aforementioned difficulties by providing an inexpensive, safe, demountable, entirely self-contained sleeping compartment which may be securely fastened above the roof of any standard make automobile of the closed or sedan type without injuring, marring or defacing the roof or body of the automobile and which may be easily attached, or removed, within a few minutes time without any special tools and which is accessible for sleeping purposes.

A preferred embodiment of the invention consists essentially of means to securely support a bedspring of ordinary construction above the roof of a closed type automobile without injuring the roof or body of the car or its finish, and of means, on the bedspring, to attach over it a collapsible frame on which may be stretched a weatherproof canopy or other covering.

The various advantages and features of the invention will appear from the detailed description which follows and from reference to the accompanying drawings.

Figure 1 is a lengthwise view, taken along lines A—A of Figs. 2, 3 and 4, showing the improved support holding a bedspring in place atop an automobile, 1 indicating the edges of the top or roof of the car upon which the support rests.

Figs. 2, 3 and 4 are cross-sectional views of the bedspring and support, taken along the lines X—X, Y—Y and Z—Z of Fig. 1, extending from one side to part way in over the top of the car, the corresponding opposite sides being exact complements of those shown in these figures.

Fig. 5 is a separate end view of one of the four corners of the bedspring frame, showing standard pipe fittings attached thereto.

Fig. 6 shows, in cross-section, the manner in which the pipe nipples 9 of Fig. 5 are welded to the angle iron members 8 which comprise the ends of the bedspring frame.

Fig. 7 is a side view of the spring and support secured in place atop the automobile.

Figure 8:
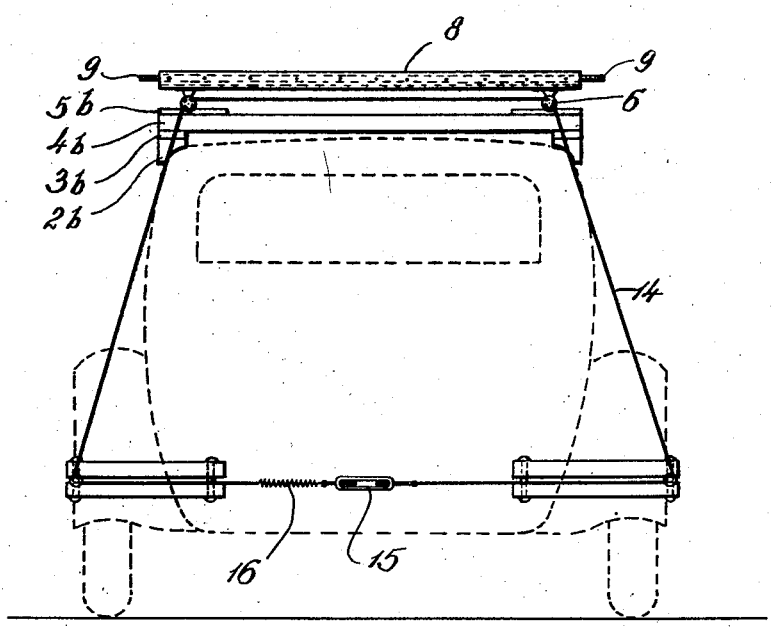
Fig. 8 is a rear end view of the spring and support secured in place atop an automobile.

The nature and arrangement of the bedspring support of this invention are such that the weight of the bedspring and its load is uniformly transferred, distributed and supported by the structurally stronger vertical side walls of the body of the automobile rather than by its relatively weak central top area. The bedspring supports are so arranged as to effect a space or clearance between the top of the car and the lowest point of the bedspring when supporting its maximum load.

The device shown in the drawings comprises a bedspring of ordinary construction mounted upon a removable support arranged transversely the relatively weak central area of an automobile top and which rests upon and conforms to the contours of the stronger sides of the automobile.

In Figs. 1, 2, 3 and 4 of the drawings, reference numerals 2a, 2b and 2c represent balsa-wood bearing members preshaped to conform substantially to the contours of the upper ends of the side walls of the automobile body upon which they rest. Joined to the upper sides of these members are hardwood facing members 3a, 3b and 3c. These hardwood members may be either pieces of board facing the upper surface of the balsa-wood, as shown by 3a and 3b, or they may be shaped to approximately conform to the contours of the surface upon which they rest, as shown by 3c of Fig. 4, in which case the balsa-wood 2c is shaped to form a facing or lining on the under surface of the hardwood. Reference numerals 4a, 4b and 4c indicate hardwood cross-piece members which transversely bridge the central top area of the automobile and which join together the component parts of each section of the support. In order to save material and to reduce weight, these hardwood cross-piece members may be built up so as to have a hollow center, as is shown by 4a in Figs. 1 and 2, or they may be solid as in the case of 4b and 4c, when the distance between the bedspring and the roof of the car is less on account of the shape of the car's top. Reference numerals 5a, 5b and 5c illustrate balsa-wood facing attached to the upper surface and at either end of the flat cross-piece members of the support sections, at the places where the lengthwise frame members 6 of the bedspring 7 rest. This balsa-wood facing makes it possible for the bedspring frame to find and form its own uniform bearings on the support by sinking into the soft and yielding balsa-wood to a certain limited extent. The self-made cradles thus formed also check any tendency of the bedspring to slip or shift transversely with respect to the car's roof.

Referring now to Fig. 5, 6 indicates one of the lengthwise frame members upon which the bedspring ordinarily rests, and 8 shows one of the end members of the bedspring to which the spring portion proper is fastened as in any standard design. The bedspring utilized may be of any of the types commonly used in the home, or bedsprings specially designed for the purpose may be employed.

In order to serve as fixed points for the erection of a light collapsible frame over which may be stretched a tent-like waterproof covering for a roof, four standard pipe nipples 9 are welded onto the ends of the bedspring frame 8, one in each corner, as indicated in Fig. 5. Standard pipe T's 10 are screwed onto these nipples. Into these T's, nipples 11, pointed upwards, are inserted to form four corner posts each about a foot high. Each transverse pair of nipples 11 serves to support a removable spring-like bow 12, the ends of which fit loosely into the open ends of the nipples 11, collars or other offsets 13 on the ends of the bows resting upon the edges of the open ends of the nipples. A waterproof covering, stretched between the bows 12, with its ends adapted to terminate in headings enveloping the bows, serves as a roof for the sleeping compartment. Waterproof canvas caps, fitted with elastic so that they may be easily put on and taken off from the inside or outside, are made to slip over the open ends of the tent-like enclosure. Exchangeable caps of mosquito netting are similarly fitted.

Before the automobile is put in motion, in order to minimize wind resistance, the waterproof canopy and its supporting frame may be arranged in a flat collapsed condition above the roof of the car by removing the tentlike covering from its frame and by withdrawing the ends of the bows 12 from their respective sockets in the nipples 11. The arrangement will then present an assembly above the top of the car which will be slightly higher than the thickness of the mattress and bedding employed.

Referring now to Fig. 8, a length of light cable 14 the ends of which are joined together by a turnbuckle 15 after attachment to the vehicle body, is threaded through one end of the spring 10 frame behind the riser and is drawn down around the rear bumper brackets or other attachments adjacent the rear wall of the car, to hold the rear end of the assembly in place. Another length of cable, the ends of which may also be joined together by another turnbuckle, is threaded through the other end of the spring frame behind the riser and is drawn down around either the headlight or front fender brackets or other attachments on the front end of the car to hold the front end of the assembly in place. By these means the entire assembly is retained against shifting with respect to the roof of the automobile upon which it is temporarily mounted. The turnbuckles permit easy and even adjustment of tension so that equal tension may be had in each of said cables. Strong spiral springs such for example as is shown at 16 in Fig. 8 may be inserted in series with the turnbuckles, to relieve any possible sudden strain to which the cables might be subjected as well as to take up any slack which might result from an increased load upon the supports, but this expedient has not been found to be necessary.

Access to the sleeping compartment, when it is in position atop an automobile, may be effected by any convenient means such as a short removable ladder placed against the rear of the car. During the time the car is in motion the ladder may be carried on top of the bedding above the roof of the car.

It is to be understood, of course, that in place of balsa-wood other materials, having similar properties, may be used for the purposes stated, the chief requirements being that the substitute have a limited degree of softness and compressibility, coupled with strength and resistance to deformation, making it ideal for distributing and transmitting the weight of the assembly gently and smoothly, and at the same time definitely and uniformly, to the relatively large curved area along the upper edges of the side walls of the automobile.

The hardwood members facing the balsa-wood bearing surfaces, and the hardwood cross-piece members may likewise be replaced by any other suitable structural material including metals.

As illustrated in the drawings, the end members 8 of the bedspring are angular with standard pipe nipples 9 welded onto them, as shown in Figs. 5 and 6. Instead of angular members, sections of standard size light weight metal pipe especially designed for the purpose may be used as end pieces for the bed spring frame, in which event the end pieces themselves may be threaded to receive the T's 10.

No exact maximum or minimum limit is placed either on the individual or the total length of the support sections along the two sides of the car. A combined length of three feet on each side, suitably distributed in three sections, has been found to be efficient. On the other hand, a support transferring the weight mainly to the relatively restricted areas under the four corners of the spring, when one end of the spring is disposed near and above the rear corners of the automobile top, has not been found to be very satisfactory, sometimes resulting in injury to the rear and adjoining side walls of the body as well as to the top of the car.

The assembly support shown in the drawings comprises three sections, a long one above the middle of the car's top and a somewhat shorter one across each end of the top. It may, however, be made in two relatively longer sections or four or more shorter ones. It may also be made in one section but a long single section support will be heavier, will be more awkward to handle, will require more material for its construction and will require greater labor in shaping its lower bearing surfaces to fit the contours of the metal sides of the top than would a number of shorter supporting sections.

A test tour of several days has proven the assembly described above to be entirely satisfactory for sleeping purposes as well as during the daytime when the automobile to which it was fastened was driven over the roughest roads imaginable, on steep up and down hills with the car listing badly, and also over good roads at speeds of fifty to sixty miles per hour. At no time were there any signs of shifting of the support or the bedspring, either in relation to each other or to the roof of the car, and there were no signs of any wear or injury on the top of the car. When the equipment was taken down, there was literally not a rub nor scratch to indicate where the support had rested, and there were no indications of bending or sagging of the top nor buckling of the side or rear walls of the automobile.

I claim:

1. A demountable sleeping assembly for use atop a closed type passenger motor vehicle comprising a bed spring, a base in one or more unitary sections adapted to support said bed spring from the vehicle top and sides including balsa wood members preshaped on their lower sides to conform substantially to and adapted to rest upon the curved longitudinal side edges of the top of the vehicle, members of hard material interconnecting said balsa wood members and partially faced on their upper surfaces with blocks of balsa wood adapted to intimately engage and support said bed spring, said balsa wood members designed to be arranged longitudinally the side edges and the hard members transverse the vehicle top and means for securing said assembly in non-shifting position atop said vehicle.

2. A demountable sleeping assembly for use atop a closed type passenger motor vehicle comprising a bed spring, a base adapted to support said bed spring from the vehicle top and sides including balsa wood members faced on their upper surfaces with members of hard material and preshaped on their lower sides to conform substantially to and adapted to rest upon the curved side edges of the top of the vehicle, additional members of hard material interconnecting the hard faced portions of each pair of said balsa wood members, additional balsa wood members joined to the upper sides of said additional members of hard material and adapted to intimately engage and support said bed spring, said balsa wood members designed to be arranged longitudinally the side edges and said additional hard members transverse the vehicle top and means for securing said assembly in non-shifting position atop said vehicle, said means comprising two lengths of cable, one threaded through each end of said bed spring behind its risers and adapted to be secured around attachments adjacent the rear and front ends of the vehicle body and turnbuckle means for taking up the slack in and joining together the ends of at least one of said lengths after attachment to the vehicle body, said cables, after tightening of said turnbuckle means, retaining the otherwise unfastened and unsecured assembly against shifting.

3. A demountable sleeping assembly for use atop a closed type passenger motor vehicle comprising a bed spring, means on said bed spring for supporting a collapsible tentlike covering thereover, a base adapted to support said bed spring from the vehicle top and sides including balsa wood members faced on their upper surfaces with members of hard material and preshaped on their lower sides to conform substantially to and adapted to rest upon the curved side edges of the top of the vehicle, additional members of hard material interconnecting the hard faced portions of each pair of said balsa wood members, additional balsa wood members joined to the upper sides of said additional members of hard material and adapted to intimately engage and support said bed spring, said balsa wood members designed to be arranged longitudinally the side edges and said additional hard members transverse the vehicle top and means for securing said assembly in non-shifting position atop said vehicle, said means comprising two lengths of cable, one threaded through each end of said bed spring behind its risers and adapted to be secured around attachments adjacent the rear and front ends of the vehicle body and turnbuckle means and spring means in series with said cable and turnbuckle means for taking up the slack in and joining together the ends of at least one of said lengths after attachment to the vehicle body, said cables, after tightening of said turnbuckle means, retaining the otherwise unfastened and unsecured assembly against shifting.

ARTHUR LUDWICK HALVORSEN.